United States Patent Office 3,142,906
Patented Aug. 4, 1964

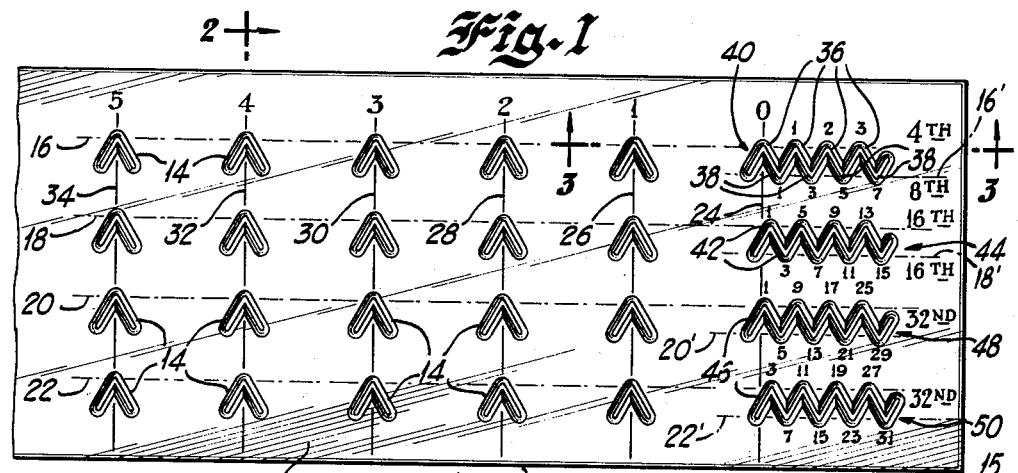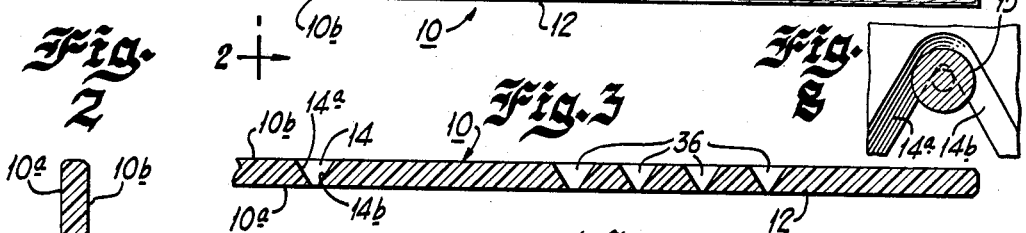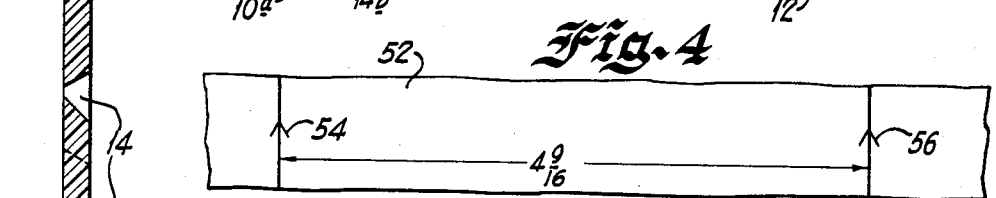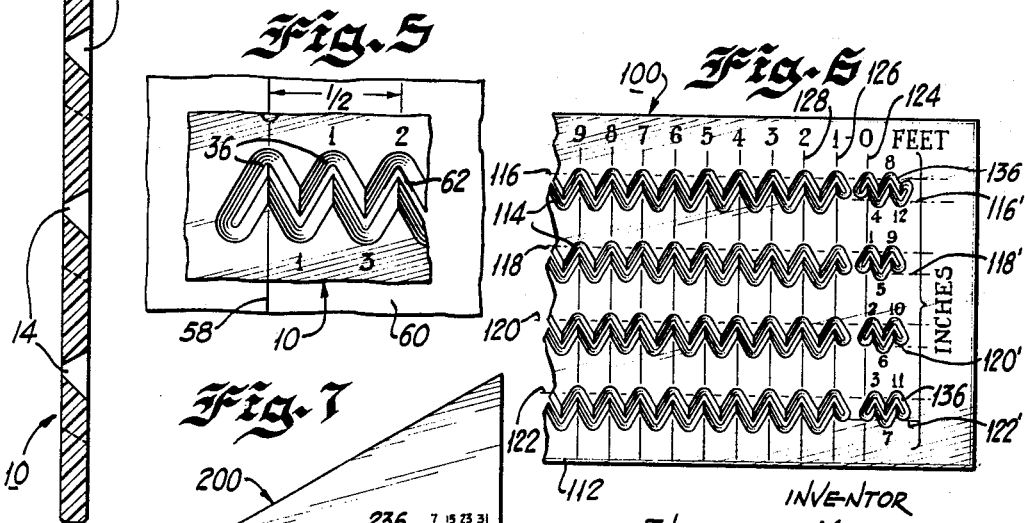

3,142,906
SCALING DEVICE
Thomas Mitsos, 801 Wheeling Road, Mount Prospect, Ill.
Filed June 13, 1962, Ser. No. 202,288
2 Claims. (Cl. 33—111)

The present invention relates to scaling devices and more particularly to scaling devices of the type adapted for use with marking instruments such as pencils, scribes, pens, etc. in marking measurements on planar surfaces, such as sheet metal, wood and other mediums such as drawings and layouts on which marks can be recorded.

Rulers, scales and templates presently available for use in marking measurements on drawings or layouts are subject to many disadvantages. Scales, such as the architect's and engineer's scale, are not only cumbersome to handle, but have very small graduations which make them hard to read. This can result in inaccurate measurements. Since rulers and scales of this type do not provide for adequate guiding of the draftsman's pencil when measuring distances, the accuracy of such measurements is somewhat dependent on the skill of the draftsman and the sharpness of the pencil or marking instruments. Because of these disadvantages, the speed at which accurate measurements can be recorded is limited.

Therefore, it is a primary object of the present invention to produce a new and improved scaling device.

Another object of the present invention is to produce a new and improved scaling device of the type adapted for use with marking instruments in marking measurements on planar surfaces of recording mediums, such as drawings, layouts, sheet metal, wood, etc.

Another object of the present invention resides in a scaling device which is easy to read, which is capable of accurately measuring very small distances, and which can be utilized with speed and extreme accuracy by an unskilled draftsman.

Another object of the present invention is to produce a scaling device which can be used to measure and mark distances, the accuracy of which is not affected to any appreciable amount by the sharpness or dullness of the marking instrument or the skill or lack thereof of the person utilizing the device.

Another object of the present invention is to produce a scaling device which can be simply and economically produced, which is easy for the user to understand and use, and which provides guiding surfaces for guiding the marking instrument as it is utilized, thereby insuring the accuracy of the distances marked.

Another object of the present invention is to provide a new and improved scaling device for accurately measuring and marking distances in metric units as well as English units and for measuring and marking angles.

Another object of the present invention is to provide a new and improved scaling device which can be readily combined with other drafting aids, such as templates, triangles, curves, lettering line guides, etc., in a single article thus reducing the number of different drafting aids needed by the draftsman and, consequently, providing for easier and faster drafting.

Briefly, the foregoing and other objects of the present invention are accomplished by providing a scaling device for use in marking desired measurements which comprises a body of thin, flat sheet material adapted to overlie the surface to be marked. There are defined in the body a plurality of guide apertures into which a marking instrument may be inserted to mark the surface of a recording medium. The guide apertures are provided with intersecting walls forming apexes which are positioned to lie along a common line at predetermined distances from one another so that the distance between any two apertures is a precise measured distance. A marking instrument can be inserted into these apertures to mark the desired distance on the surface of the medium.

In one embodiment of the invention, the apertures comprise a plurality of V-shaped slots aligned side by side with the apexes of the slots positioned to lie along common lines. A first plurality of slots are positioned along lines at one-inch intervals and a second plurality of slots are positioned along lines at intervals of fractions of an inch.

In another embodiment of the invention, a first plurality of V-shaped slots are provided in the body with the apexes of the slots positioned along common lines at one-quarter inch intervals indicating "feet" in a scale of ¼"=1'-0" (commonly used in architectural drawings). Another plurality of V-shaped slots are provided with their apexes along common lines parallel to or coextensive with the common lines of the first plurality at intervals indicating "inches" in a ¼"=1'-0" scale.

In still another embodiment of the invention having slots arranged according to any of the other embodiments, the body of the device is made in the shape of a triangle or other desirably shaped drafting aid.

Other objects and advantages of the present invention will become apparent from considering the following detailed description in conjunction with the drawings in which:

FIG. 1 is a plan view of a scaling device embodying the present invention and designed for marking distances in inches and fractions of an inch down to thirty-seconds;

FIG. 2 is a sectional view taken substantially along line 2—2 of FIG. 1;

FIG. 3 is a sectional view taken substantially along line 3—3 of FIG. 1;

FIG. 4 illustrates a drawing or other recording medium that has been marked utilizing the scaling device of FIG. 1 for providing the desired distance measurement;

FIG. 5 is a plan view of a drawing or other recording medium and a fragmentary portion of the scaling device of FIG. 1 illustrating the use of the scaling device to measure a given distance from a line on the drawing;

FIG. 6 is a plan view of another embodiment of the present invention designed for marking distances in feet and inches on a scale of ¼"=1'-0";

FIG. 7 is a plan view of another embodiment of the present invention having a triangular shape; and FIG. 8 is an enlarged, fragmentary, plan view illustrating a guide aperture with a marking instrument inserted therein and engaging the guiding side walls.

Referring now to the drawing, there is illustrated a scaling device 10 (FIGS. 1-3) which embodies the present invention and which includes a body formed of thin, flat, sheet material such as transparent plastic material of the type generally used for making drafting aids, such as triangles, curves, etc. The device can be made in a generally rectangular shape, as illustrated in FIG. 1, or can be of any appropriate shape, such as triangular (FIG. 7), so that it will serve additional functions for the draftsman besides its use as a scaling device. The device may be provided with at least one straight edge 12 so that it can be positioned to slide along a T-square or other drafting aid having a straight edge.

There are provided in the body of the device 10 a plurality of V-shaped apertures indicated generally as 14. These apertures are provided with intersecting walls 14a and 14b (see FIG. 8) which serve as guides for guiding the point of a marking instrument 15 toward the apex formed at the intersection of these walls. Consequently, the shape of the slots 14 are not limited to the V-shape illustrated but can be of any appropriate shape, such as rectangular or triangular, having two intersecting walls. Also, the point of the marking instrument 15 can be semi-cylindrical in cross-section as well as cylindrical or generally conical in configuration so that there are surfaces thereon which engage both of the walls 14a and 14b to center the marking instrument. As can be seen from FIG. 3, the walls 14a and 14b of V-slots 14 are sloping and the slots are narrower in width at a lower surface 10a adapted to lie on the medium to be marked than at an upper surface 10b. The sloping walls provide guiding surfaces for accurately directing a pencil or marking instrument which has been inserted in these slots to the apex of the V. In practice, a slot width of approximately 1/32 of an inch at the surface 10a tapering to a slot width of approximately 1/8 of an inch at the surface 10b has been found to be satisfactory when the device is made of material having a thickness of 3/32 of an inch. The legs of the V-slots intersect at an angle of approximately sixty degrees; however, angles larger or smaller can be utilized with consequent decrease or increase, respectively, in the accuracy of marking.

The V-slots 14 are positioned in side-by-side relation to one another with their apexes lying along imaginary parallel lines 16, 18, 20 and 22, which are parallel to the edge 12. In the embodiment shown in FIG. 1, the apexes of the slots along any one of these lines are spaced at one-inch intervals to the left of an imaginary transverse zero line 24. Numerals 1, 2, 3, 4, 5, etc. are placed above the apexes of the adjacent slots on the line 16 to indicate the distance of these apexes from the zero line 24. Vertical column lines 26, 28, 30, 32, 34, etc. under the numerals 1, 2, 3, 4, 5, respectively, at the apexes of the V-slots 14 may be provided on the lower surface 10a of the device 10 to facilitate lining up of the device on lines already present on the drawing, as illustrated in FIG. 5. Of course, the slots on the lines 18, 20 and 22 which are in vertical alignment with these numerals are also the same distance from the zero line.

To the right of the zero line are provided another plurality of V-slots 36, aligned in side-by-side relation having their apexes aligned on line 16. These apexes are spaced at 1/4 inch intervals and are lettered by the numerals 1, 2, 3 and the designation 4th to indicate their distance from the zero line as being 1/4 inch, 2/4 inch and 3/4 inch, respectively.

The V-slots 36 communicate with a plurality of downwardly directed V-slots 38 having their apexes positioned along the imaginary line 16' which is parallel to line 16, thus forming a continuous zig-zag slot 40. These apexes on line 16' are spaced at 1/4 inch intervals and are lettered by the numerals 1, 3, 5, 7 and the designation 8th to indicate their distance from the zero line as being 1/8 inch, 3/8 inch, 5/8 inch and 7/8 inch, respectively.

To the right of the zero line are provided another plurality of V-slots 42, forming another continuous zig-zag slot 44 with apexes positioned in side-by-side relation along the line 18 and imaginary line 18' which is parallel thereto and below. The adjacent apexes on the lines 18 and 18' are also spaced at 1/4 inch intervals from one another. Adjacent apexes on line 18 are lettered by the numerals 1, 5, 9, 13 and the designation 16th indicating that these apexes are 1/16 inch, 5/16 inch, 9/16 inch and 13/16 inch, respectively, from the zero line. Adjacent apexes on the line 18' are lettered by the numerals 3, 7, 11, 15 and the designation 16th indicating that these apexes are 3/16 inch, 7/16 inch, 11/16 inch and 15/16 inch, respectively, from the zero line.

This same type of arrangement, only for 32nds of an inch, is carried out with the V-slots 46 forming continuous zig-zag slots 48 and 50 having apexes positioned on the lines 20 and 22, and their respective imaginary parallel lines 20' and 22' to the right of the zero line. Again, adjacent apexes of V-slots on any one of these parallel lines are spaced at 1/4 inch intervals as in the previous cases for the 4ths, 8ths and 16ths. It is to be understood that a similar arrangement could be accomplished utilizing the metric system and/or decimal fractions as well. By this system the V-slots 36, 38, 42 and 46, etc. are all the same size, which facilitates the manufacturing of the scaling device. Division to smaller fractions can be easily accomplished by utilizing more parallel lines for any one fractional division or decimal fraction.

It is to be understood that the embodiment just described is only an example and that it is within the scope of this invention to utilize differently shaped slots having intersecting walls forming apexes with the apexes positioned to provide angular measurements as well as linear measurements in the metric system, such as meters, decimeters, centimeters, etc., and decimal fractions thereof. To provide angular measurements, the apexes may be positioned at various angular intervals on a circular line around a central apex or index.

FIG. 4 illustrates a drawing 52 on which, for example, it is desired to measure and mark the distance 4 9/16". In order to accomplish this, the scaling device 10 is placed over the drawing 52 and a pencil or marking instrument inserted in the V-slot 14 under column 4 (line 32) for inches on the line 18 and the arrow mark 54 is made. Without moving the scaling device, the pencil is then inserted in the zig-zag V-slot 44 at the apex under number 9 on line 18, and the arrow 56 is made. The points of these arrows are precisely 4 9/16" apart, since the V-slots effectively guide the point of the pencil to a sharp apex.

FIG. 5 illustrates the use of the scaling device 10 for establishing a given distance (for example, 1/2 inch) from a line 58 already present on a drawing 60. The device 10 is positioned so that the zig-zag V-slot 40 is placed with the apex under the 0 numeral on line 16 or the zero line itself on the surface 10a of the device is lined up with the line 58. A pencil or other marking instrument is then positioned in the V-slot 40 under the numeral 2 on line 16 and the arrow 62 is made on the drawing at precisely 1/2 inch from the line 58.

In FIG. 6 there is illustrated another embodiment of a scaling device 100 designed for use in making architectural drawings. As an example, a commonly used scale of 1/4"=1'-0" has been utilized in positioning a plurality of continuous zig-zag V-slots 114 in side-by-side relation with their apexes positioned to lie along the parallel longitudinal lines 116, 118, 120 and 122, which are parallel to the straight edge 112 of the device 100. The apexes of the V-slots 114 are positioned to extend to the left (at 1/4 inch intervals indicating feet on the chosen scale) of a vertical zero line 124 marked with the numeral 0 extending perpendicular to the longitudinal lines 116, 118, 120 and 122. The successive apexes on the line 116 are marked with numerals 1–9 etc., indicating their distance in feet from the zero line. Vertical lines 126, 128, etc., parallel to the zero line 124 are placed on the lower surface of the device 100 under these numerals to aid in lining up the proper apex for the desired distance as previously described in connection with the FIG. 5 illustration.

To the right of the zero line 124 there are provided a plurality of zig-zag V-slots 136 having their apexes (placed in side-by-side relation to each other) and positioned to lie on the lines 116, 118, 120 and 122 and lines 116', 118', 120' and 122' parallel thereto. These apexes are marked with the numerals 1–12 which indicate the distance in inches on the scale that the apexes are positioned from the zero line 124. For instance, if it were desired to mark a distance of, for example, 6'-11", a pencil or other marking instrument would be inserted in the V-slot 114 in the apex located on line 122 under the numeral column 6 and an arrow mark made. The pencil would then be inserted in the V-slot 136 in the apex on the line 122 under the numeral 11 and an arrow mark made. The points of the arrow marks would be precisely 6′–11″ apart on a scale of ¼″=1′–0″.

FIG. 7 illustrates yet another embodiment of a scaling device 200 made in the shape of a triangle and having the lower straight edge 212 so that the device is useful as a regular triangle for drafting as well as a scaling device. The device 200 may be provided with appropriate V-slots 214 and 235 in a pattern described previously for the device 10, or, of course, can have any useful slot spacing for the decimal system or architectural drawings as desired.

Thus, the present invention, by the use of appropriately placed apertures, provides a means for accurately marking desired measurements down to very small divisons.

While there have been shown and described several embodiments of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. A scaling device for use with a marking instrument in marking measurements on a planar surface of a recording medium, said device comprising a body having a flat surface adapted to overlie said planar surface and formed of thin, flat, transparent sheet material having defined therein a plurality of V-shaped slots, each of said slots having side walls intersecting to form an apex, said walls formed at angles to the flat surface of said body forming guide means for guiding the marking instrument to the apex of said slots when said instrument is inserted in said slots for marking on said medium, said body defining at least one straight edge, said plurality of slots comprising a first group of slots with their apexes aligned to lie on a common line parallel to said straight edge at equal predetermined distances apart and a second group of slots forming a continuous zig-zag slot with each V-shaped slot therein aligned in side-by-side relation with their apexes aligned to lie on lines parallel to said common line at intervals which are fractions of said predetermined distances.

2. A scaling device for use with a marking instrument in marking measurements on a planar surface of a recording medium, said device comprising a body having a flat surface adapted to overlie said planar surface and formed of thin, flat, transparent sheet material having defined therein a plurality of V-shaped slots, each of said slots having side walls intersecting to form an apex, said walls formed at acute angles to the flat surface of said body forming guide means for guiding the marking instrument to the apex of a slot when said instrument is inserted therein for marking on said medium, said body defining at least one straight edge, a first line marked on said flat surface of said body parallel to said straight edge, a second line marked on the flat surface of said body normal to said straight edge, said plurality of slots comprising a first group of slots aligned in side-by-side relation with their apexes aligned to lie on said first line at predetermined distances apart in one direction from said first line and a second group of slots aligned in side-by-side relation with their apexes aligned to lie on a line parallel to said common line at predetermined intervals which are fractions of said predetermined distances in an opposite direction from said second line.

References Cited in the file of this patent

UNITED STATES PATENTS

| | | |
|---|---|---|
| 854,351 | Hight | May 21, 1907 |
| 1,179,242 | Tilney | Apr. 11, 1916 |
| 1,497,492 | Engel | June 10, 1924 |
| 1,699,619 | Muench | Jan. 22, 1929 |
| 2,554,099 | Ermold | May 22, 1951 |
| 2,585,847 | Roshkind | Feb. 12, 1952 |
| 2,883,754 | Luebkeman | Apr. 28, 1959 |

FOREIGN PATENTS

| | | |
|---|---|---|
| 465,178 | France | Jan. 31, 1914 |

OTHER REFERENCES

Warren-Knight Catalogue Part II Drafting Supplies (DS–A 22105) 136 North 12th St., Philadelphia 7, Pa. page 22.